United States Patent Office 2,946,049
Patented July 19, 1960

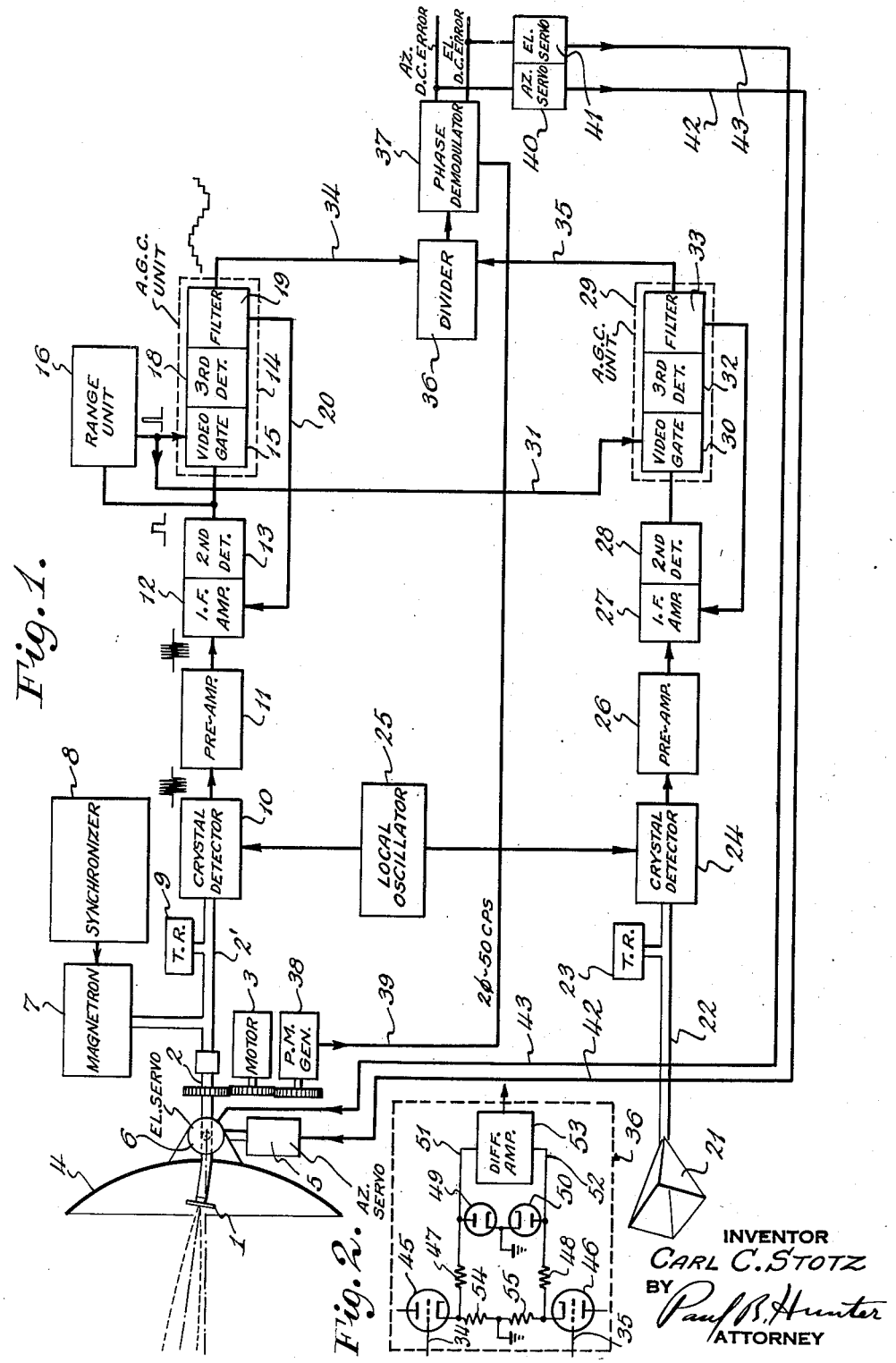

2,946,049

RADAR TRACKING SYSTEM

Carl C. Stotz, Floral Park, N.Y., assignor to Sperry Rand Corporation, a corporation of Delaware Filed Feb. 9, 1950, Ser. No. 143,214

6 Claims. (Cl. 343—7.4)

This invention relates to radar systems and the invention has reference more particularly to a novel automatic radar tracking system designed to improve the accuracy of target following by the substantial elimination of errors heretofore encountered as a result of rapid changes in target reflectivity.

Automatic tracking radar systems heretofore proposed generally used two different methods of determining the angle of position of a target or craft. The most commonly used method has been what is known as sequential lobing or conical scan, where the beam is moved about an axis of rotation extending from the antenna in the direction of the target. One beam is used and at least one revolution of the beam must be made before complete information of target position is obtained. The second method is known as simultaneous lobing or monopulse in which two or more beams are used simultaneously to scan the target for determining target position. In this method, complete information of the target position can be obtained from one radar echo and nearly instantaneously.

The target echo received by a sequential lobing radar is amplitude modulated at the lobing rate and the percentage of this modulation is zero when there is no error between the beam rotating axis and the angular position of the target or object scanned. For limited regions, this modulation increases in magnitude with increasing error. The fundamental frequency of the modulation is the lobing frequency, and the phase of the modulation as measured with respect to the beam rotation angle indicates the direction of the error. In a sequential lobing tracking radar, the lobing modulation is normally recovered from the desired target echo pulse and fed into phase sensitive demodulators which also utilize reference voltages generated by an A.C. generator driven by the rotating antenna. The outputs of the phase sensitive demodulator consists of D.C. voltages proportional to the respective errors in azimuth and elevation, i.e., the angular displacements of the rotating beam axis in azimuth and elevation from a line passing through the target. These "error signals" drive the azimuth and elevation antenna servos in such a direction as to reduce the angular error.

Systems as heretofore proposed have suffered inaccuracies because of rapid changes in target reflectivity. These fluctuations are primarily responsible for the characteristic erratic hunting or "jitter" heretofore encountered in tracking radars. Other sources of error such as servo defects, thermal receiver noise and atmospheric effects have been unimportant in comparison to the error due to reflectivity variations. Target reflectivity variations may arise from the rotation of the propellers of the aircraft and from the changing aspect of a moving aircraft as seen by the radar. An aircraft has dimensions of many wavelengths in the microwave frequencies used in radar and consequently has an exceedingly complex re-radiation pattern with maximum to minimum reflectivity variation occurring due to changes in aspect angle of a fraction of one degree. As a result, the echo from a moving aircraft target is modulated by large percentages in almost a random manner independently of lobing modulation. For example, the lobing modulation percentage may be of the order of 1%, while the jitter modulation may approach 100%. Since the jitter modulation contains frequency components near the lobing frequency, the tracking circuits respond to jitter modulation also. In the case where the aircraft propeller happens to cause modulation at the lobing rate, a constant angular error will occur. When this modulation is very near the lobing rate, the tracking antenna will spiral about the target clockwise or counterclockwise depending upon whether the frequency is higher or lower than the lobing frequency.

Heretofore this jitter caused by reflectivity variations has been reduced to some extent by the use of integrators or filters in the tracking servos which reduce the bandwidth of the servos so that fewer jitter frequency components are accepted. However, this process does not provide an ideal solution since the overall system has to be capable of following target accelerations which requires some minimum value of bandwidth and servo performance to prevent excessive errors due to acceleration.

The principal object of the present invention is to provide a novel automatic radar tracking system incorporating means for substantially eliminating the adverse effects of reflectivity variations of the target.

Still another object of the present invention is to provide a novel automatic radar tracking system that is relatively simple in construction and reliable in use.

In brief, the invention is to provide a novel automatic tracking radar system employing a conical scan antenna and connected receiver for transmitting and receiving, together with a relatively wide angle auxiliary antenna and connected receiver, the detected output of the two receivers being divided to obtain a signal that is independent of reflectivity variations.

Other objects and advantages will become apparent when taken in connection with the accompanying drawings of which Fig. 1 is a schematic representation of the novel system of this invention.

Fig. 2 is a wiring diagram of one form of a divider.

Referring now to the drawings, the reference numeral 1 designates a scanning antenna of the conical scanning type fed through a wave guide section 2 driven by a constant speed motor 3. The antenna 1 is provided with a parabolic reflector 4 adapted to be angularly turned in azimuth and elevation by the azimuth and elevational servos 5 and 6 respectively whereby the antenna 1 is adapted to be intermittently supplied with ultra-high-frequency energy from the ultra-high-frequency transmitter 7 shown as of the magnetron type which is controlled in its operation by the synchronizer or pulse generator 8. Energy initially radiated by antenna 1 and reflected from a remote target is received by this antenna and is then supplied through wave guide section 2 and guide 2' past the T.-R. box 9 and to crystal detector 10, which passes the waveform shown to the preamplifier 11, which amplifies this initially detected signal and supplies the same to intermediate frequency amplifier 12, the signal thereafter being detected by a second detector 13, which produces the substantially square waveform shown.

The signal from detector 13 passes to the automatic gain control unit 14 having a video gate 15 controlled from a range unit 16, which latter selects the desired echo signal, i.e., depending upon the range desired, this range unit serving to track the target in range and produces a narrow gate as shown for controlling the video gate 15, i.e., for selecting those portions of the output of the second detector, which are to be passed to the third detector 18. The third detector 18 receives the gated signal and after demodulation passes the same to a filter 19, the output of which is a stepped error signal as shown, and may, for example, be a 50 cycle per second error signal, where the antenna 1 rotates at 50 cycles or revolutions per second. A portion of the output of the filter 19 is fed back over line 20 to intermediate frequency amplifier 12 for automatically controlling the gain of this amplifier.

An auxiliary non-scanning antenna 21 shown as of the horn type and which may be supported to turn with reflector 4 so as to have a zone of reception substantially co-extensive with the entire scanning region of antenna 1, is connected through a wave guide feed 22, past T.-R. box 23 to first crystal detector 24. Crystal detectors 10 and 24 are supplied from a common local oscillator 25. From the crystal detector 24, the detected signal passes to the preamplifier 26 and from thence to I.-F. amplifier 27 and second detector 28. From second detector 28, the signal passes to an automatic gain control unit 29 similar to unit 14, the video gate 30 of this unit being controlled over conduit 31 from the range unit 16 just as in the case of video gate 15. The output of the video gate 30 is again detected by detector 32 and filtered by filter 33. The outputs of automatic gain control circuits 14 and 29 are fed over leads 34 and 35 to a dividing circuit or divider 36, the output of which is supplied to a phase demodulator 37 which is also supplied with a two-phase reference frequency voltage corresponding to the scan rate of the antenna 1, which may, for example, be 50 cycles per second. This reference voltage is supplied from the PM generator 38 driven from motor 3 over lead 39.

The output of the phase demodulator 37 is connected to the transmitting end of the azimuth and elevational servos 40 and 41, the outputs of which are supplied over conduits 42 and 43 for controlling the operation of azimuth and elevational servos 5 and 6.

In operation, the signals received by antenna 1 are modulated by reflectivity variations of the target and by two-way transmission through this main antenna. On the other hand, the echo power or signal received by the auxiliary antenna 21 is modulated by reflectivity variations which modulation is approximately one-half as much as that received by the main antenna 1 since the signal received by the auxiliary antenna has passed through the main antenna only once. By dividing the detected doubly-modulated signals from the main antenna in the divider 36 with the singly-modulated signals received from the auxiliary antenna 21, a signal is obtained that is substantially independent of reflectivity variation and contains a lobing modulating component or error signal, for example, a 50 cycle component equivalent to that which would be obtained by a one-way transmission of energy through the main antenna 1. This process may be shown mathematically as follows.

The peak power of the echo received by a radar system is as follows:

$$Pr = \frac{PtGtArAe}{16\pi^2 R^4} \quad (1)$$

where:

$Pr$ = peak echo power (watts)
$Pt$ = peak transmitted power (watts)
$Gt$ = transmitting antenna gain (dimensionless)
$Ar$ = receiving antenna area (meters)$^2$
$Ae$ = target effective area (meters)$^2$
$R$ = target range (meters)

The gain and area of an antenna are related as follows:

$$A = \frac{G\lambda^2}{4\pi} \quad (2)$$

where:

$A$ = effective antenna cross section (meters)$^2$
$\lambda$ = wavelength (meters)
$G$ = antenna gain (dimensionless)

Where the same antenna receives and transmits, the equation for received power may be rewritten:

$$Pr = \frac{PtG^2\lambda^2 Ae}{64\pi^3 R^4} \quad (3)$$

or $$Pr = \frac{PtA^2 Ae}{4\pi\lambda^2 R^4} \quad (4)$$

where:

$A$ = effective antenna cross section
$G$ = antenna gain

In the usual case of angular tracking, where $Pt$ and $\lambda$ are fixed, and slow changes due to change of R are made very small by A.G.C. action, $Pr$ is proportional to $G^2$ and $Ae$, so that:

$$Pr = KG^2 Ae \quad (5)$$

where $K$ = constant

The conical scanning or lobe switching process causes G to vary periodically at the scan rate. The amplitude and phase of this variation, or the modulation of the echoes, contains complete information with respect to amount and direction of the angular error. The variation of antenna gain may be expressed:

$$G = Go\,[1 + f(t)] \quad (6)$$

where:

$Go$ = average antenna gain
$f(t)$ is a function that is repetitive at the scan rate, is always zero with zero error, and is also a function of error direction and amplitude, and beam shape.

The auxiliary broad-beam non-scanning, receiving antenna 21 receives echoes from the same target that has been illuminated by the conical scanning radar antenna 1. The received power is:

$$Pra = \frac{PtGAraAe}{16\pi^2 R^4} \quad (7)$$

where:

$Pra$ = peak echo power received by auxiliary antenna
$Ara$ = effective cross section of auxiliary antenna
$G$ = gain of scanning antenna as in Eq. 3, 5 and 6
$Ae$ = target effective area, as in Eq. 1, 3, 5.

Since the auxiliary antenna is not scanning, $Ara$ is constant, and $Pt$, and $R^4$ can be considered constant as before.

Therefore:

$$Pra = Ka\,GAe \quad (8)$$

where $Ka$ = constant

If the signal represented by Eq. 8 is divided by divider circuit 36 into the signal represented by Eq. 5, a signal independent of $Ae$, but still containing G is obtained:

$$S = \frac{Pr}{Pra} = \frac{KG^2 Ae}{KaGAe} = \frac{K}{Ka}G \quad (9)$$

where $S$ = error signal that is independent of target area fluctuation.
(This assumes $Ae$ never becomes too small.)

From the above discussion it can be seen that an error signal that is independent of target reflectivity (as long as the echo never drops down to the noise level) can be obtained. With the above system the error modulation of the echoes is only that due to one-way transmission through the scanning antenna. However, if the effect of $Ae$ variation is eliminated, the system error signal vs. error sensitivity can be made as high as desired merely by increasing the amplification anywhere in the servo loop, the limiting condition being servo stability.

From Equations (7) and (1) it is seen that:

$$Pra = \frac{Ara}{Ar}Pr \quad (10)$$

With the broad-beam auxiliary antenna (21), Ara will be less than Ar and Pra will not emerge from the receiver noise level until the target range is less than the maximum range of the conical scan radar. Assuming equal noise levels in each receiver, for a value of Pra equal to Pr this range would be:

$$Ra = Rmax \frac{(Ara)^{1/4}}{Ar} \quad (11)$$

If operation of this system is required out to only 50% of maximum tracking range, an auxiliary antenna cross section of only 1/16 of that of the main antenna would suffice. For many applications maximum angular tracking accuracy is not required until the target has approached to a fraction of the maximum detection range.

However, even for cases where accurate tracking near maximum range is required, the system of this invention is entirely feasible where an auxiliary antenna of large dimensions is permissible.

The divider circuit 36 may be of the type shown in Fig. 2 wherein cathode follower tubes 45 and 46 are shown having their grids connected to leads 34 and 35. Relatively large resistors 47 and 48 are connected in the cathode circuits of these tubes 45 and 46 and to the plates of diodes 49, 50, which plates are also connected by leads 51, 52 to a differential amplifier 53, the output of which is connected to the phase demodulator. As is well known, the resistance of a diode varies with the voltage across the same, which voltage may be expressed as follows:

$$E = K \log I$$

where E is the voltage across the diode and I is the current passing through the diode. Since the resistance of the diodes 49, 50 is low and since that of resistors 47 and 48 are large, then $$I = \frac{E_1}{R}$$

where:

$E_1$ = the voltage applied across each cathode resistor 54 and 55.
$R$ = the resistance of each of the resistors 47, 48, then
$\log I = \log E_1 - \log R$, but $$\frac{E}{K} = \log E_1 - \log R \text{ or}$$

$$E = K \log E_1 - K'$$

Thus it will be seen that the diodes 49, 50 take the logs of the applied voltages and by passing their outputs to the difference amplifier 53, division of the signals on leads 34, 35 is obtained in the output in the difference amplifier.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:
1. A radar tracking system comprising a scanning antenna, an auxiliary antenna, means for supplying said scanning antenna with pulsed ultra-high-frequency energy for radiation into space, receivers connected to be supplied from said scanning antenna and from said auxiliary antenna respectively for detecting and amplifying signals received after reflection from a remote target, a combining circuit connected to the outputs of said receivers and a demodulator connected to the output of said combining circuit the output of said demodulator constituting essentially an error signal variable in accordance with the departure of the target from the center of scan of the scanning antenna, said error signal being substantially free of any component due to reflectivity variations of the target.

2. A radar tracking system as defined in claim 1 wherein said auxiliary antenna is so proportioned and mounted as to have a signal reception zone substantially co-extensive with the entire scanning field of said scanning antenna.

3. An automatic radar tracking system comprising a conical scanning antenna, an ultra-high-frequency pulse transmitter connected for supplying said antenna with ultra-high-frequency energy, a receiver connected to said antenna for receiving energy emitted therefrom and reflected from remote objects, a broad-beam non-scanning auxiliary antenna so proportioned and mounted as to have a receptivity pattern substantially encompassing the field of scan of said scanning antenna, a receiver supplied from said auxiliary antenna, a combining and demodulating means connected to the outputs of said receivers, and a servo system controlled from the output of said combining and demodulating means and connected for actuating said scanning antenna for maintaining the axis of the same in coincidence with a line extending to the target scanned.

4. An automatic bearing tracking system for pulse-echo apparatus comprising an antenna system having a scanning transmitting and receiving antenna with a conical scanning lobe and a receiving antenna so proportional and mounted as to have a zone of reception encompassing the scanning field of said scanning antenna, a transmitter and receiver coupled to said scanning antenna, a receiver coupled to said receiving antenna, a combining circuit connected for receiving the outputs of said receivers, detecting means connected to the output of said combining circuit, and motive means connected to be responsive to the output of said detecting means to orient said scanning antenna for tracking a target.

5. A receiving system for automatically tracking the bearing of regularly recurring intermittent signals, comprising an array consisting of a conical scanning antenna and a non-scanning antenna having overlapping zones of receptivity, a pair of circuit channels for separately translating the energy received by the receptive antennae, said circuit channels each having means for detecting and gating said energy to fix upon the desired recurring signals, means for combining the outputs of said channels, means for demodulating the output of said combining means, and servo means controlled from said demodulating means for actuating said scanning antenna in its tracking operation.

6. A radar system comprising a scanning antenna, a transmitter connected for feeding said antenna, a pair of receivers, one of said receivers being connected for receiving scan modulated and reflectivity modulated signals responsive to a target, the other of said receivers being connected for receiving reflectivity modulated signals received from said target, a combining circuit connected to be supplied from said receivers for producing a control signal substantially eliminating the modulated component of said signals responsive to change in target reflectivity, the control signal output of said combining circuit being substantially dependent upon the extent of departure of the target from a desired line of sight, and motive means responsive to said control signal for operating said scanning antenna.

References Cited in the file of this patent
UNITED STATES PATENTS

| | | |
|---|---|---|
| 2,409,462 | Zworykin | Oct. 15, 1946 |
| 2,427,029 | Stearns | Sept. 9, 1947 |
| 2,427,219 | Luck | Sept. 9, 1947 |
| 2,457,396 | Pollard | Dec. 28, 1948 |
| 2,459,117 | Oliver | Jan. 11, 1949 |
| 2,513,282 | Busignies | July 4, 1950 |